A. C. EKLE.
CONTROL FOR TRANSMISSION GEARS.
APPLICATION FILED JULY 30, 1917.
1,309,469.
Patented July 8, 1919.
3 SHEETS—SHEET 1.
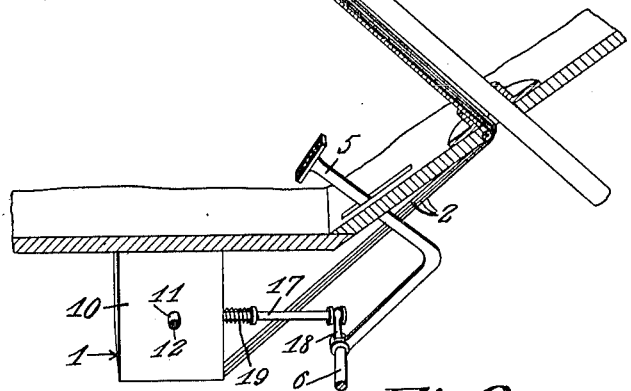
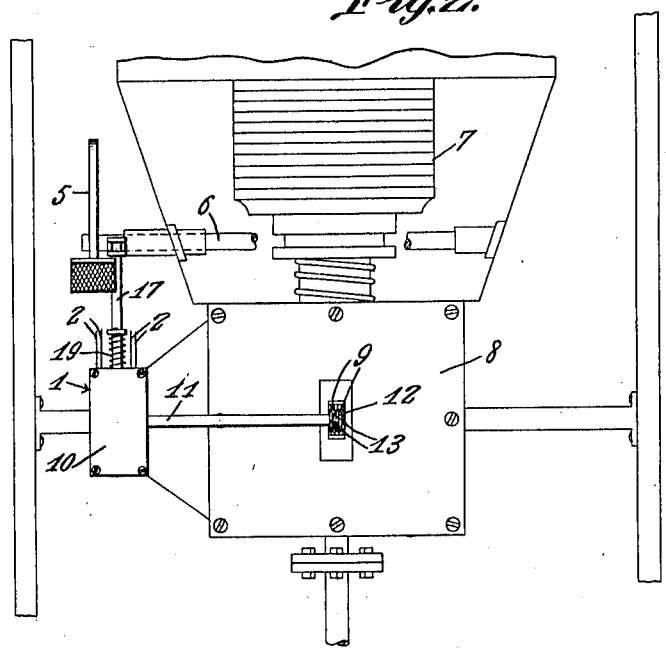

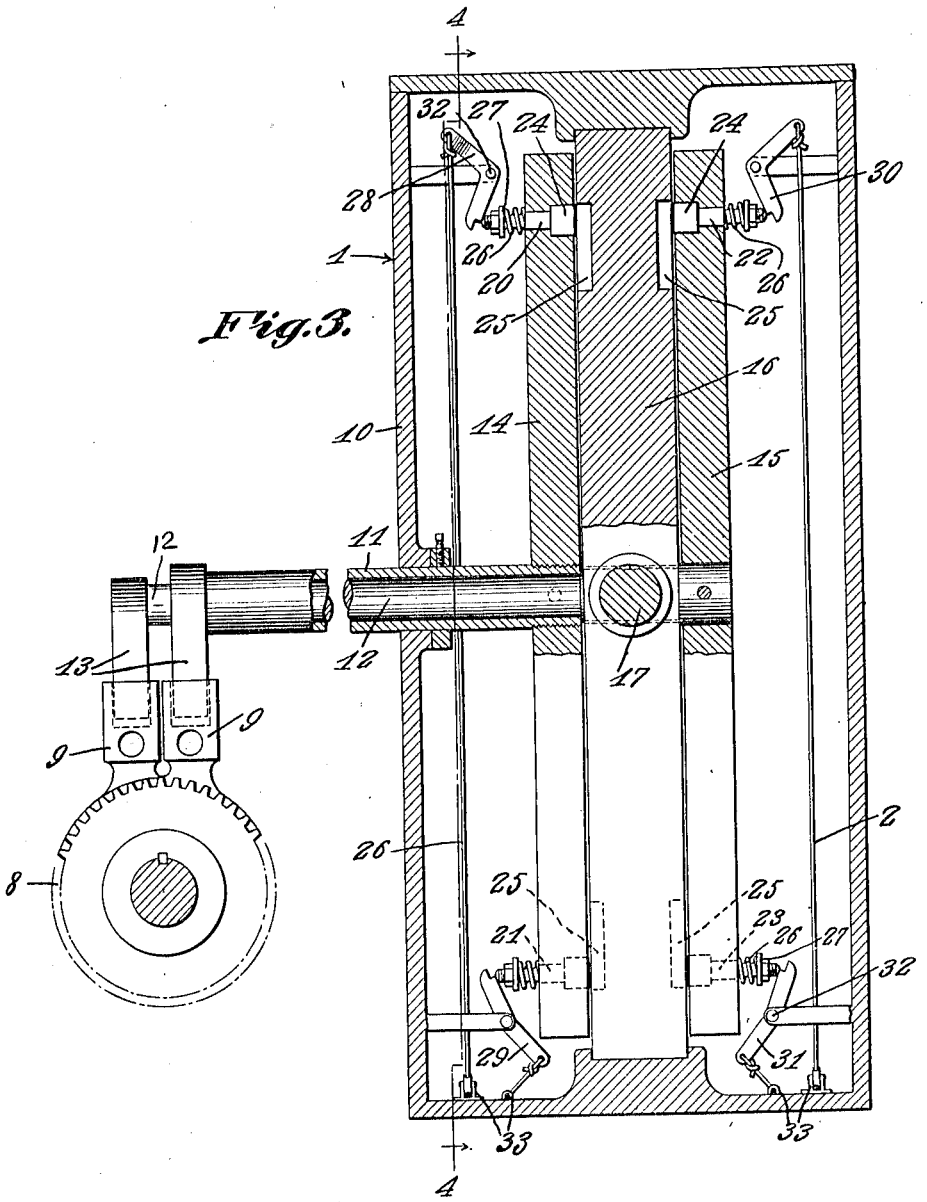

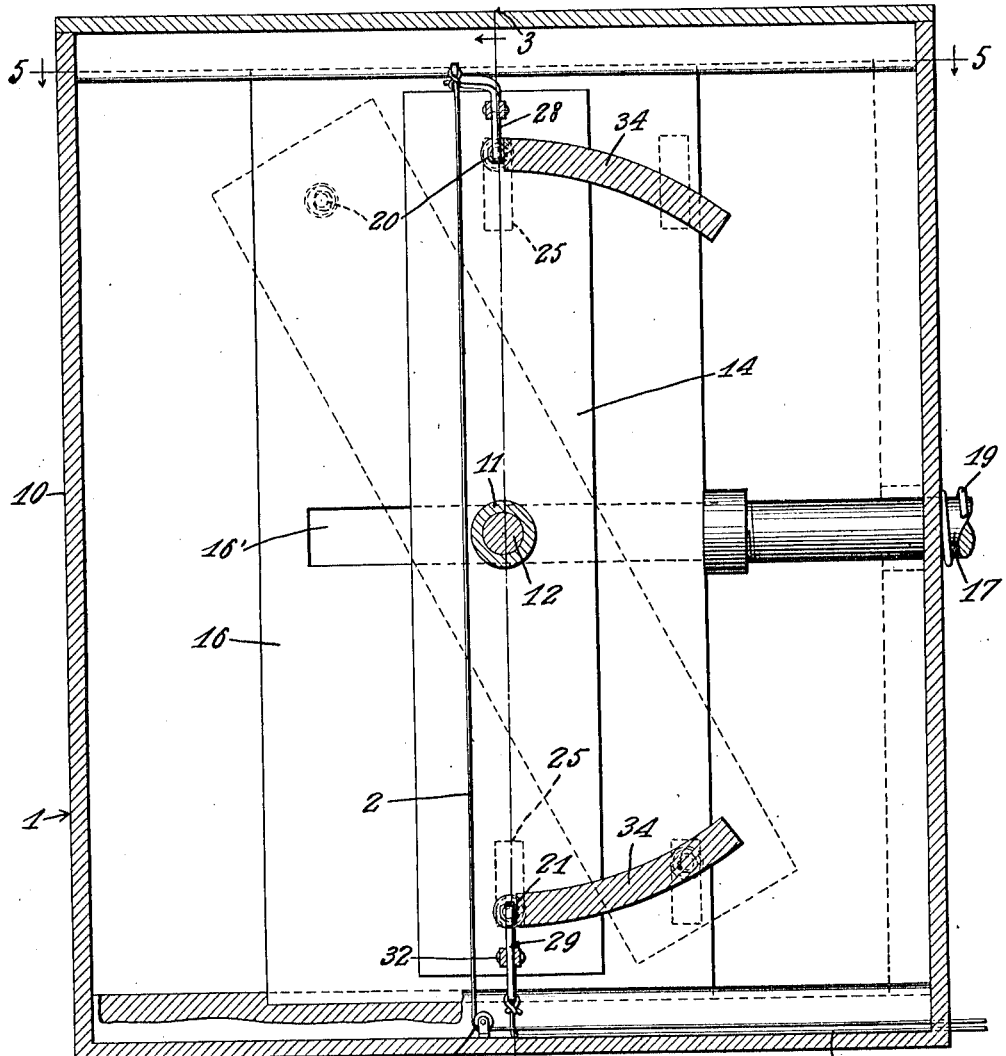
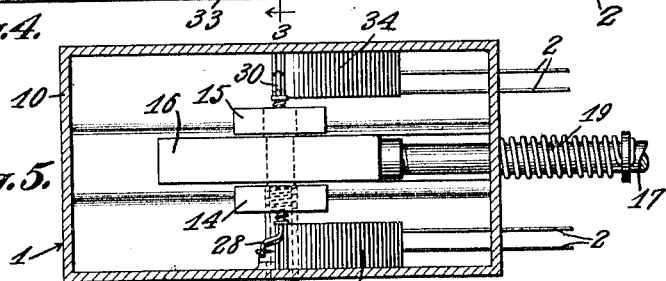

UNITED STATES PATENT OFFICE.

ALEXANDER CARL EKLE, OF MANKATO, MINNESOTA.

CONTROL FOR TRANSMISSION-GEARS.

1,309,469.     Specification of Letters Patent.     Patented July 8, 1919.

Application filed July 30, 1917. Serial No. 183,519.

*To all whom it may concern:*

Be it known that I, ALEXANDER CARL EKLE, a citizen of the United States, residing at the city of Mankato, in the county of Blue Earth and State of Minnesota, have invented a new and useful Control for Transmission-Gears, of which the following is a specification.

The present invention appertains to a controlling device for transmission mechanism, and aims to provide novel and improved means for controlling and operating a gear shift or other type of transmission mechanism in a convenient and practical manner, a foot pedal or other operating member being used for all changes in speed, to avoid confusion, and the selection being made by means of a set of buttons or equivalent elements, one of which when moved resulting in the device being properly operated by the foot pedal or actuating member to shift the transmission gears according to the selected speed desired, while when other buttons are moved, the actuation of the pedal or actuating member will set the transmission mechanism for other speeds.

The present device enables the transmission mechanism to be conveniently controlled and operated, without the necessity of manipulating the actuating member to accomplish the setting of the transmission mechanism for different speeds, the present device being comparatively simple and inexpensive, as well as being practical and efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Figure 1 is a perspective view of the device, somewhat diagrammatical in nature.

Fig. 2 is a plan view, portions being broken away.

Fig. 3 is an enlarged section on the line 3—3 of Fig. 4.

Fig. 4 is a section on the line 4—4 of Fig. 3.

Fig. 5 is a reduced section on the line 5—5 of Fig. 4.

The present device is designated generally by the numeral 1, and has connected therewith a plurality of wires or other flexible elements 2, of which there are four as illustrated. These wires are guided by any suitable means to a selective controlling device 3, which may be attached to the steering column of an automobile or to any other suitable support within convenient reach of the operator. This device 3 has a plurality of buttons 4 or equivalent controlling elements to which the wires 2 are connected, whereby the buttons can be selectively operated for pulling the wires, which control the device 1, while said device is operated to shift the gears, by means of a foot pedal 5 or other suitable operating lever or member. As illustrated, the foot pedal 5 is mounted on a rock shaft 6 that controls the clutch 7 between the transmission mechanism 8 and the engine (not illustrated), whereby when the foot pedal 5 is pushed, the clutch will be released, before the transmission mechanism is set for another speed. The operative connection of the rock shaft 6 and clutch 7 is not illustrated, since it is not a part of the present invention. The transmission mechanism 8 has two slides 9 normally in intermediate position, and movable in opposite directions for providing three forward and one reversed speed, according to well known practice.

The present device embodies a suitable casing 10, through one side of which is journaled for rotation a tubular rock shaft 11, a second rock shaft 12 extending through the rock shaft 11; the outer ends of said rock shafts have arms 13 engaging the slides 9, whereby the rock shafts in being oscillated will move said slides for shifting the gears. Secured upon the inner ends of the rock shafts 11 and 12 within the casing 10, are the respective levers 14 and 15, said levers being attached intermediate their ends to the rock shafts. A slide 16 is guided within the casing for sliding movement between the levers 14 and 15 of the respective rock shafts 11 and 12, and said slide has a slot 16′ for accommodating the shaft 12 where it extends between the levers. This slide 16 is connected with the foot pedal 5, the slide having a stem 17 connected thereto and projecting out of the casing 10 and operatively connected with an arm 18 connected through a lever 17' and link 18' to the rock shaft 6. Thus, when the foot pedal 5 is pushed forwardly, the arm 18 is swung forwardly to push the stem or rod 17 and slide 16 rearwardly. The parts are returned by means of a coiled spring 19 between the stem 17 and casing 10, when the foot is removed from the pedal 5. The slide 16 is used for swinging or rocking the levers 14 and 15 and their rock shafts, as will presently appear.

Slidably mounted within the upper and lower arms of the lever 14 are the latches 20 and 21, respectively, while the respective latches 22 and 23 are slidable within the upper and lower arms of the lever 15. Said latches have heads 24 projectable into recess 25 with which the slide 16 is provided in opposite sides above and below the rock shafts. The heads 24 are movable into the levers, to limit the movement of the latches when retracted by means of the coiled springs 26 surrounding them and confined between the levers and collars 27 on the stems of the latches. Said springs serve to normally retract the latches. When any one latch is projected into the respective recess 25, this will pivotally connect the corresponding arm of the respective lever with the slide, whereby said arm will be swung forwardly when the slide is pulled forwardly by the movement of the pedal 5. Thus, by selectively moving the latches into engagement with the slide, the rock shafts 11 and 12 can be operated as desired to control the transmission mechanism.

In order to selectively move the latches into engagement with the slide, there are provided the respective levers 28, 29, 30 and 31 for the latches 20, 21, 22 and 23, fulcrumed, as at 32, within the casing adjacent to said latches, and the wires or flexible elements 2 are connected to said levers, whereby when the wires are pulled, the levers are swung to engage the heel ends of the latches and project them into engagement with the slide 16. The wires are guided by any suitable means, as at 33. In order to retain the latches in engagement with the slide when the slide is moved from normal position, arcuate tracks 34 are carried by the sides of the casing for the sliding movement of the heel ends of the latches, which can be provided with suitable means to reduce friction. The tracks 34 extend forwardly from the latches, whereby when a latch is moved into engagement with the slide and the slide moves forwardly to carry said latch with it, the heel end of the latch slides along the respective track 34 and said track holds the latch in the respective recess 25 of the slide until the slide is returned to normal position, in which event the latch is removed from the track 34 and will be disengaged from the slide by its spring 26.

In operation the lever 5 is depressed to push the slide 16 rearwardly to neutral position. One of the buttons is then operated to swing the lever 28. This lever will push the latch 20 into the corresponding recess 25 of the slide 16, and while the said button 4 is held, the pedal 5 is released, whereby the spring 19 will pull the slide 16 forwardly to normal position. The latch 20 will, therefore, be moved with the slide, the heel end thereof sliding from the lever 28 into engagement with the corresponding track 34, to hold the latch in engagement with the slide, until the parts are returned to normal position. Thus, the upper end of the lever 14 is swung forwardly, to turn the shaft 11 in the corresponding direction, and move the corresponding slide 9 accordingly. The button 4 need only be held momentarily until the pedal 5 is started in its movement, to hold the latch 20 in engagement with the slide until the slide is moved to carry the latch into engagement with the track 34. Then, when the foot pedal 5 is again pushed forward, the lever 14 is swung backwardly to normal position by the slide 16, and the latch 20 being retracted by the spring 26 when it moves off of the track 24. By operating the lever 29, the lower latch 21 of lever 14 is engaged with the slide, whereby the lower arm of the lever will be swung forwardly with the slide, thereby turning the shaft 11 in the opposite direction and moving the corresponding slide 19 accordingly. By operating the levers 30 and 31, the latches of the upper and lower arms of the lever 15 are engaged with the slide, whereby the lever 15 and shaft 12 can be swung in either direction, to move the respective slide 9 accordingly. Thus, by operating the buttons 4, the desired speeds can be selected, and the operation of the pedal or lever 5 will, therefore, properly shift the gears, the pedal 5 being in each case simply pushed by the foot, and need not be shifted or manipulated for providing the different speeds, as is customary with hand levers for the shift gears as now used.

Having thus described the invention, what is claimed as new is:

1. A device of the character described, embodying an actuating member, a lever having opposite arms, latches carried by the arms of said lever for the connection with the actuating member when the parts are in one position, selectively operable means for moving the latches into connection with the actuating member, and means for retaining the latches in connection with the actuating member when moved from said position.

2. A device of the character described, embodying a slide, a lever having opposite arms, means for moving the slide, latches carried by said arms and engageable with the slide when the parts are in one position, selectively operative means for moving the latches into engagement with said slide, and means for holding the latches in engagement with the slide when the same is moved from said position.

3. A device of the character described, embodying a slide having recesses, a lever having opposite arms, spring retracted latches carried by said arms and projectable into said recesses, selectively operative means for moving said latches into said recesses, and tracks for holding said latches in said recesses when projected thereinto and moved with the slide from one of its positions.

4. A device of the character described, embodying a casing, a tubular shaft extending through one wall thereof, a second shaft extending through the tubular shaft, levers secured between their ends to said shafts within the casing, a slide movable within the casing between said levers and having opposite recesses, spring retracted latches carried by the arms of said levers and movable into said recesses, selectively operable means within the casing for moving said latches into said recesses, and tracks within the casing for holding the latches in said recesses when moved with the slide from one of its positions.

5. A device of the character described, embodying a pair of levers each having opposite arms, a slide movable between said levers, latches carried by the arms of the levers and engageable with said slide, and means for selectively moving said latches into engagement with the slide.

In testimony that I claim the foregoing as my own, I have hereto affixed my signature in the presence of two witnesses.

ALEXANDER CARL EKLE.

Witnesses:
 IVAN BOWEN,
 HELEN JORGENSEN.